US005531518A

United States Patent [19]

Alves

[11] Patent Number: 5,531,518

[45] Date of Patent: Jul. 2, 1996

[54] ATTACHMENT FOR DISPENSING CHUTE AND/OR SPLASH GUARD

[76] Inventor: Kenneth B. Alves, 22 Norwich Rd., Ludlow, Mass. 01056

[21] Appl. No.: 501,721

[22] Filed: Jul. 12, 1995

[51] Int. Cl.$^6$ .............................. B28C 7/16; B65G 11/20

[52] U.S. Cl. .................................... 366/68; 193/4; 193/10

[58] Field of Search ................................ 366/41, 68, 184, 366/187, 188, 189, 347, 349, 606; 193/1, 2 R, 4, 10; 222/526, 567

[56] References Cited

U.S. PATENT DOCUMENTS

| | | | |
|---|---|---|---|
| 1,040,392 | 10/1912 | Ogle et al. | 193/2 R |
| 1,220,249 | 3/1917 | McWhorter . | |
| 2,050,774 | 8/1936 | Wilcox | 193/4 |
| 2,717,769 | 9/1955 | Masek | 366/68 |
| 2,969,862 | 1/1961 | Worrell | 193/4 |
| 3,053,367 | 9/1962 | Lynch | 193/10 |
| 3,249,192 | 5/1966 | Buskirk | 193/4 |
| 3,542,179 | 11/1970 | Prichard | 193/10 |
| 3,746,140 | 7/1973 | Schiffelbein | 193/5 |
| 3,866,889 | 2/1975 | Maxon, III . | |
| 4,688,667 | 8/1987 | Peterson | 193/10 |
| 5,186,299 | 2/1993 | Stimson | 193/2 R |
| 5,354,128 | 10/1994 | Lewis | 366/68 |

*Primary Examiner*—Charles E. Cooley

*Attorney, Agent, or Firm*—Ross, Ross & Flavin

[57] ABSTRACT

A delivery device for delivering freshly mixed concrete includes an open-ended concrete conveyor chute having an inner guide surface and an outer surface defining a generally U-shape along a main axis and with a receiving terminus at one end and a discharge terminus at the opposite end. An arcuate belly band is sleeved over and fixed to the outer surface of the chute adjacent its discharge terminus and has a forwardly-projecting ear on each end of the belly band extending forwardly of and upwardly above the respective upper planes of the chute and belly band. There is a rearwardly-facing notch in each ear. A U-shaped frame defines a pair of oppositely-disposed rearwardly-projecting arms. Each arm is disposed outboard of a respective ear of the belly band and with an inwardly-facing lateral-extending lug at the distal end of each arm and with a cross arm extending between and connected to the arms and being receivable in the notches of the ears. There is a ratchetable cinch strap looped over each arm of the frame adjacent the belly band and being tightenable against the chute outer surface for bringing the strap into tight embracing position against the chute. A deflecting skirt is disposed forwardly of and in spaced relation to the discharge terminus of the chute for deflecting concrete charged thereagainst. The skirt includes loops fixed at its uppermost edge and is sleevable on the frame for allowing the dependence of the skirt from the frame.

1 Claim, 1 Drawing Sheet

ATTACHMENT FOR DISPENSING CHUTE AND/OR SPLASH GUARD

BACKGROUND OF THE INVENTION

1. Field of the Invention

This invention relates to an attachment adapted to be applied to the discharge end of an elongate concrete dispensing chute.

Common practice is to mix cement in a transit mixer truck during transit from a supply station to a worksite and to dispense the mixed slurry of concrete by means of an elongate, rigid, upwardly opening U-shaped metal discharge chute having a receiver end related to the discharge end of the mixing drum rotatably mounted relative to the transit mixer truck and a discharge end which is adapted to be arranged upwardly of the situs or item onto or into which the slurry is to be deposited.

The receiver end of the discharge chute is mounted adjacent the mixing drum so that it can be swung or pivoted in a horizontal plane as circumstances require. Further, the ordinary chute is mounted so as to provide for the horizontal and/or vertical adjustments of its discharge end.

Chutes presently known are often inconvenient and/or difficult to use, especially if the concrete is intended for deposit in a narrow form or in a form of irregular shape or in a form where the dimensions are exceptionally small.

The typical chute has obvious shortcomings by reason of its inflexibility not to mention its great weight especially in the work mode with a cement slurry running.

The invention comprehends a new and novel attachment for the discharge end of a delivery chute of the character referred to, wherewith the slurry can be conveniently and accurately directed to the predetermined area of the work site.

The invention envisions apparatus inclusive of an arcuate apron supported relative to a framework engageable with and attached to the discharge end of the chute, whereby the apron may be manually manipulated for moving or shifting relative to the chute discharge end whereby the flow path of a concrete can be advantageously directed without appreciable spatter.

2. Description of the Prior Art

The best patent references I have been able to find are as follows:

| | | |
|---|---|---|
| #1,220,249 | McWhorter | Mar. 27, 1917 |
| #2,050,774 | Wilcox | Aug. 11, 1936 |
| #3,053,367 | Lynch | Sept. 11, 1962 |
| #3,249,192 | Buskirk | May 3, 1966 |
| #3,746,140 | Schiffelbein | July 17, 1973 |
| #3,866,889 | Maxon | Feb. 18, 1975 |
| #4,688,667 | Peterson | Aug. 25, 1987 |
| #5,186,299 | Stimson | Feb. 16, 1993 |

SUMMARY OF THE INVENTION

The invention is designed to accommodate to a large variety of discharge chutes for concrete trucks, of either the front discharge type or rear discharge type, although it is operable at its top proficiency on a front discharge type of truck.

It has been observed that, normally, in dealing with concrete flowing down the chute to the situs, concrete may splash into the face of an attending workman, he, of necessity, standing close to the chute, it being his responsibility to hold a shovel or the like in front of the running flow to deflect the charge leaving the chute.

Because the shovel does not have a large surface, the worker must be looking down at it to keep it in place, hence the danger. The job is tedious and the worker can easily be distracted, causing the shovel to move out of place and the concrete to pour in an inappropriate place. With the invention hereof, the worker can now go to another job, which can only increase the overall speed of the operation.

The pouring of concrete is usually at various angles, so, as the angle of the chute-to-site changes, so may the angle of the apparatus hereof. The ease of use, makes the worker's job somewhat easier too.

DESCRIPTION OF THE PREFERRED EMBODIMENT

Figure 1:
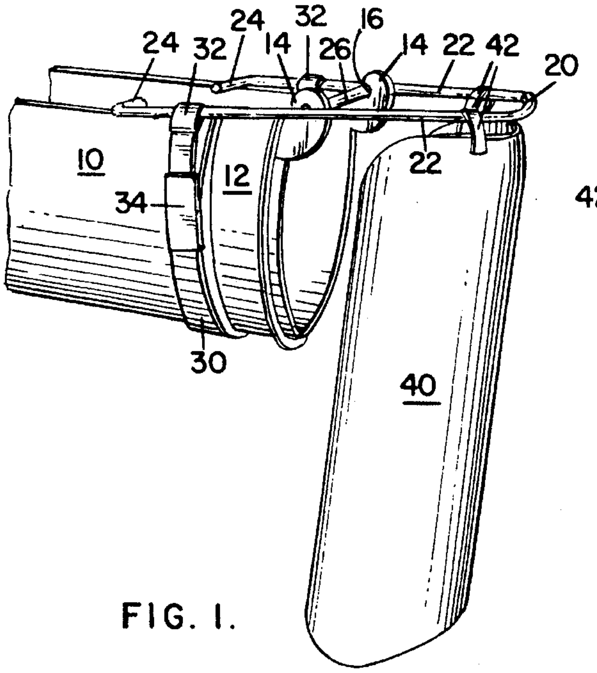
FIG. 1 is a fragmentary front perspective view of the splash guard attached to the discharge end of a typical delivery chute.
Figure 3:
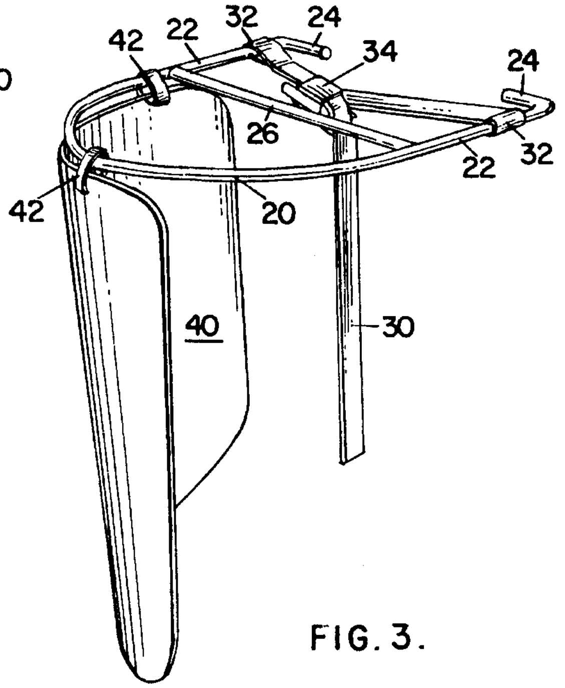
FIG. 3 is a rear perspective view of the splash guard attachment.
Figure 2:
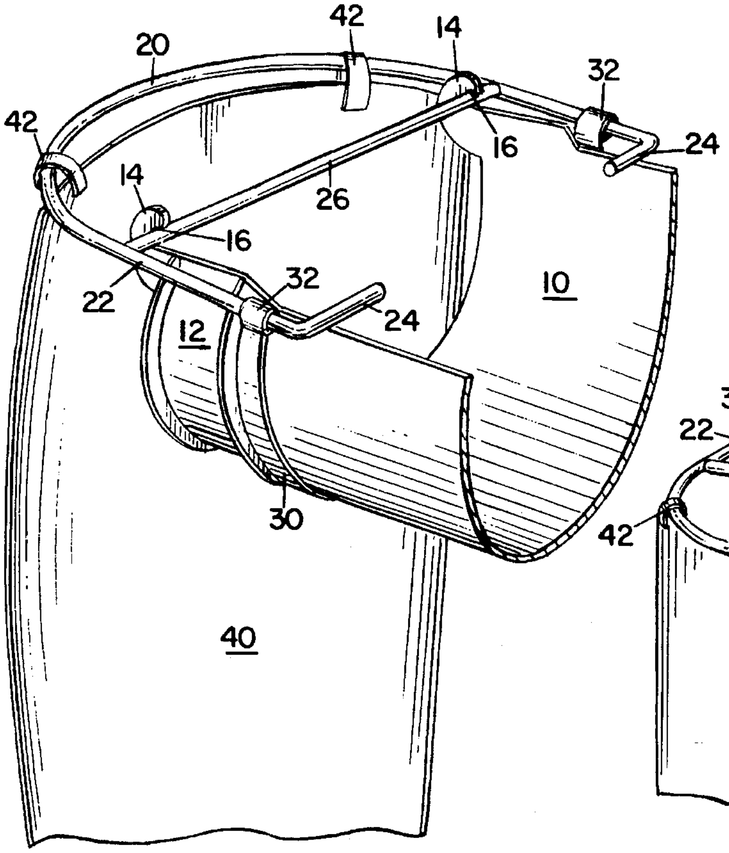
FIG. 2 is a fragmentary rear perspective view of the splash guard attachment, and delivery chute.
Figure 4:
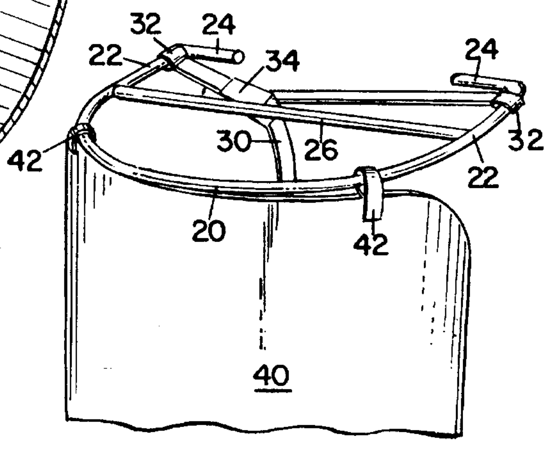
FIG. 4 is a fragmentary front perspective view of the splash guard attachment.

The rearward end of a typical concrete ready mix truck comprising a mixing drum rotatively supported on the truck chassis has an elongate open ended delivery chute 10 of U-shaped configuration with an inlet or receiver end and a discharge end to accommodate, during use, displacement of concrete along a guided path having a substantial inclined component.

The discharge end of the chute causes concrete to leave the chute and to fall generally as a vertical stream over the discharge end, usually in substantial alignment with a form or other concrete receiving area or means spaced away from the truck.

The chute is suitably pivotally supported relative to the drum so as to receive the concrete issuing from the drum and also to allow for any desired swinging or pivoting of the chute to facilitate the positioning of the chute discharge end above or adjacent the point or station where it is desired that the concrete be deposited.

This structure, as above set forth, is conventional and is so well known to those skilled in the art as to suggest that further detailed explanation is unnecessary.

The discharge end of the typical chute 10 is open and has on its underside an adjacent reinforcing band 12 secured to the chute for strengthening same, the weight of concrete being discharged being understandably heavy.

The outer wall of the chute is also provided with a pair of forwardly-projecting ears 14, there being one on each side, which ears extend upwardly above the respective upper planes of the sides of the chute 10. Each ear 14 is provided with a rearwardly facing notch 16.

The apparatus is comprised of a horizontally disposed U-shaped rearwardly-facing frame 20, which frame is axisymmetric in configuration, being symmetric in respect to its axis so that each rearwardly-projecting arm 22 thereof is disposed outboard of the respective side and ear of the chute, there being an inwardly facing lug 24 at each terminus of the frame which can be brought to bear upon the respective upper edge of the side wall of the chute.

A girth or ratchet strap 30 is cinched by the tightening thereof against the outer exterior wall of the chute so as to bring the frame into and hold same at tight embracing position against the chute exterior wall.

A skirt or apron 40 is held in loose depending relation relative to the framework by means of hooks 42 in manner such that the skirt can be moved relative to the frame according to the arc defined by the framework.

A cross arm 26 is provided to extend between the arms 22 and is nestably receivable adjacent its opposite ends in each notch 16.

The adjustable girth 30 consists of a two part, strap with a loop 32 in each part each loop being trained over one of the arms of the frame and with an adjusting ratchet buckle 34 interconnecting the two strap parts.

The skirt or apron will preferably be of firm but flexible low density polyethylene so as to hang on the half circle bar by a pair of loops 42 hooks and be movable from one side of the chute to the other side. This movement will depend on the angle of the chute to the site. As the chute may be moved to a different spot relative to the site, the apron is also moved so the concrete can flow smoothly. The apron hangs from the frame. This allows the concrete to be deflected against the apron as it flows outwardly.

The unit can be used on all different types of chutes—ones that do not have hooks at the ends but rather a bar and the hooks are at the other end of the chute.

I claim:

1. In a delivery system for delivering freshly mixed concrete, the improvement comprising:

an open-ended concrete conveyor chute for discharging concrete and having a concave inner guide surface and a convex outer surface defining a generally U-shape along a main axis and opposite termini defining an entry terminus and a discharge terminus, an arcuate belly band sleeved over and fixed to the outer surface of the chute adjacent its discharge terminus with a forwardly-projecting ear on each end of the belly band and the ears extending forwardly of and upwardly above respective upper planes of the chute and belly band, a rearwardly-facing notch in each ear, a U-shaped frame defining a pair of oppositely-disposed rearwardly-projecting arms, each arm disposed outboard of a respective ear of the belly band and each arm having an inwardly-facing lateral-extending lug at the distal end of each arm and with a cross arm extending between and connected to the arms and being receivable in the notches of the ears, a ratchetable cinch strap looped over each arm of the frame adjacent the belly band and being tightenable against the chute outer surface for bringing the strap into tight embracing position against the chute, and a deflecting skirt disposed forwardly of and in spaced relation to the discharge terminus of the chute for deflecting concrete charged thereagainst, the skirt including loop means fixed at uppermost edge thereof and the apron being sleevable on the frame for allowing the dependence of the skirt from the frame and pivoting of the skirt in an arc according to the frame configuration and in an orthogonal orientation relative to the chute main axis.

* * * * *